United States Patent
Min et al.

(10) Patent No.: US 10,448,663 B2
(45) Date of Patent: Oct. 22, 2019

(54) COFFEE ROASTER

(71) Applicant: CMTECH CO., LTD., Daegu (KR)

(72) Inventors: Heung Sik Min, Daegu (KR); Young Keun Ahn, Daegu (KR); Sung Jin Yang, Daegu (KR); Jin Woo Min, Daegu (KR)

(73) Assignee: CMTECH CO., LTD., Daegu (KR)

(*) Notice: Subject to any disclaimer, the term of this patent is extended or adjusted under 35 U.S.C. 154(b) by 0 days.

(21) Appl. No.: 14/908,754

(22) PCT Filed: Apr. 4, 2014

(86) PCT No.: PCT/KR2014/002904
§ 371 (c)(1),
(2) Date: Jan. 29, 2016

(87) PCT Pub. No.: WO2015/016454
PCT Pub. Date: Feb. 5, 2015

(65) Prior Publication Data
US 2016/0183586 A1      Jun. 30, 2016

(30) Foreign Application Priority Data
Jul. 30, 2013   (KR) .................. 10-2013-0090331

(51) Int. Cl.
*A23N 12/10* (2006.01)
*A23F 5/04* (2006.01)

(52) U.S. Cl.
CPC .............. *A23N 12/10* (2013.01); *A23F 5/04* (2013.01)

(58) Field of Classification Search
CPC ...... A47J 37/044; A47J 37/1214; A23N 12/10
(Continued)

(56) References Cited

U.S. PATENT DOCUMENTS 4,503,760 A * 3/1985 Pryputsch ............. F24C 15/322
                                              126/21 A
4,860,461 A * 8/1989 Tamaki .................. A23N 12/10
                                              34/267
(Continued)

FOREIGN PATENT DOCUMENTS

EP         1665943 A1     7/2006
JP       S61-007990 U     1/1986
(Continued)

OTHER PUBLICATIONS

Extended European Search Report issued in corresponding European Application No. 14832840.0 dated Feb. 2, 2017, 5 pages.
(Continued)

*Primary Examiner* — Tu B Hoang
*Assistant Examiner* — Thomas J Ward
(74) *Attorney, Agent, or Firm* — Snyder, Clark, Lesch & Chung, LLP (57) ABSTRACT

The present invention relates to a coffee roaster having a housing, a supporting plate located within the housing, a drum chamber located at one side of the supporting plate within the housing, a first support for supporting the drum chamber, and a second support for supporting the drum chamber. The supporting plate may include a heater. The first support may be adjacent to the outer circumferential surface of the drum chamber. The second support may be adjacent to the outer circumferential surface of the drum chamber and be spaced apart from the first support by a predetermined distance. As the drum chamber rotates by receiving a driving force for rotation from the first supporting unit, the drum chamber can be rotated without being obstructed by the heater.

20 Claims, 5 Drawing Sheets

(58) Field of Classification Search
USPC .... 219/389, 400, 492; 99/323.5, 323.9, 355, 99/348, 474, 467, 483; 34/68, 267
See application file for complete search history.

(56) References Cited

U.S. PATENT DOCUMENTS

| | | | | |
|---|---|---|---|---|
| 5,182,981 | A * | 2/1993 | Wilcox | A23N 12/10 |
| | | | | 219/389 |
| 5,638,607 | A * | 6/1997 | Lemme | A23N 12/10 |
| | | | | 219/385 |
| 6,036,988 | A | 3/2000 | Lemme et al. | |
| 6,382,087 | B1 * | 5/2002 | Iiyama | A23N 12/10 |
| | | | | 34/225 |
| 2004/0074400 | A1 * | 4/2004 | Song | A23N 12/10 |
| | | | | 99/483 |
| 2008/0134907 | A1 * | 6/2008 | Iiyama | A23N 12/08 |
| | | | | 99/467 |

FOREIGN PATENT DOCUMENTS

| | | | |
|---|---|---|---|
| JP | 2504530 | B2 | 6/1996 |
| JP | 3655341 | B2 | 10/1996 |
| JP | 2005-083697 | A | 3/2005 |
| JP | 2005080602 | A | 3/2005 |
| JP | 4415199 | B2 | 2/2010 |
| JP | 5992815 | B2 | 8/2016 |
| KR | 10-2001-0106819 | A | 12/2001 |
| KR | 10-0463341 | B1 | 12/2004 |
| KR | 10-2006-0105998 | A | 10/2006 |
| KR | 10-2011-0019409 | A | 2/2011 |
| KR | 10-2011-0082656 | A | 7/2011 |
| KR | 10-2012-0096835 | A | 8/2012 |
| KR | 10-1181717 | B1 | 9/2012 |
| WO | 9716985 | A1 | 5/1997 |
| WO | 0028831 | A1 | 5/2000 |
| WO | 2013006718 | A1 | 1/2013 |

OTHER PUBLICATIONS

International Search Report and Written Opinion issued in corresponding International Application No. PCT/KR2014/002904 dated Jun. 18, 2014, 5 pages.

* cited by examiner

COFFEE ROASTER

CROSS-REFERENCE TO RELATED APPLICATION

This application claims priority from Korean Patent Application No. 10-2013-0090331 filed on Jul. 30, 2013 in the Korean Intellectual Property Office, and all the benefits accruing therefrom under 35 U.S.C. 119, the contents of which in its entirety are herein incorporated by reference.

BACKGROUND

1. Field of the Invention

The present invention relates to a coffee roaster, and more particularly to a coffee roaster, which has a simplified configuration and high heat efficiency by providing a heating means fixed within a rotating drum chamber, thereby improving roasting quality of coffee beans.

2. Description of the Related Art

A process for changing the internal structure of coffee for a predetermined time by applying heat to coffee beans is referred to as roasting, and a coffee roaster refers to a device used to roast coffee. The taste of coffee is determined by the type of coffee beans used and by numerous process parameters, including temperature, humidity, time and so on, during roasting.

In most major brands of coffee, coffee beans are roasted in a large-sized factory using advanced facility and technology and are then packaged to be supplied or distributed to shops that brew and sell coffee. Roasted coffee beans decay in taste and flavor with the lapse of time from the moment roasting is completed. Thus, the best option for enjoying the taste and flavor of coffee is to consume coffee as fast as possible once roasting is completed.

In this connection, the recent trend of coffee roasting is that a vastly increasing number of small-scale cafes having their own roasting machines in their business places, directly purchasing green coffee beans and roasting in only small batches on site for consumption to serve the best quality coffee to their customers with ensured freshness of coffee. Accordingly, there is a rising demand for coffee roasters capable of roasting to meet the trend and demand for better quality of roasting.

A general coffee roaster is known in Korean Patent Application No. 10-2000-27797 disclosing a direct-heating type roaster in which a surface of a cylindrical drum laid in a horizontal direction is heated using a gas burner or an oil burner while rotating the cylindrical drum, roasting is performed using the internal air of the heated drum, and after the roasting is completed, a front door is opened to discharge the roasted coffee beans to a cooling device.

Figure 1:
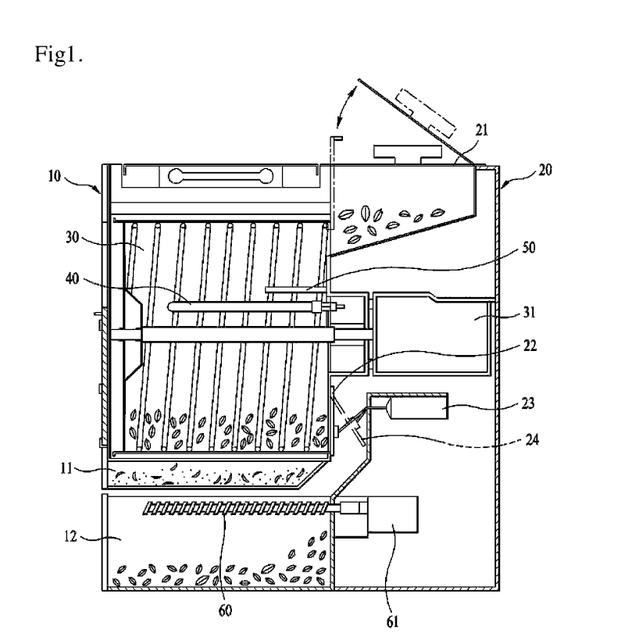
FIG. 1 is a side sectional view of a conventional coffee roaster.

As illustrated in FIG. 1, the conventional coffee roaster includes a front supporting plate 10 having a hull receiving base 11 and a coffee bean receptacle 12 installed thereon, a rear supporting plate 20 including a supply means 21 for inputting coffee beans and an exhaust door 24 for opening or closing a coffee bean exhaust hole 22 by an actuator member 23 and coupled to the front supporting plate 10, a drum chamber 30 installed between the front supporting plate 10 and the rear supporting plate 20 and roasting coffee beans, a first driving member 31 incorporated into the rear supporting plate 20 to rotate the drum chamber 30, a heating means 40 installed in the rear supporting plate 20 to heat the inside of the drum chamber 30, a temperature sensor 50 installed in the rear supporting plate 20 to sense the internal temperature of the drum chamber 30, a transfer conveyor 60 actuated by a second driving member 61 installed in the rear supporting plate 20 to allow the coffee beans discharged from the drum chamber 30 to be evenly discharged into the coffee bean receptacle 12, and a control unit installed in the front supporting plate 10 and controlling a roasting process of coffee beans.

The aforementioned conventional coffee roaster has the following problems.

First, since the conventional coffee roaster is configured such that the drum chamber 30 is entirely rotated, a surface of the drum chamber 30 proximal to the heating means 40 is heated earlier than the inside of the drum chamber 30. Thus, coffee beans being in continuous contact with the surface of the drum chamber 30 may be scorched and only the skin thereof tends to burn without being evenly roasted.

Second, since the conventional coffee roaster is configured such that the drum chamber 30 is entirely rotated, a large driving force is required and the load of the drum chamber 30 is transferred to a rotary shaft, which may adversely affect the durability of the rotary shaft. To avoid this, the first driving member 31 may have increased capacity and size and may make a loud operating noise, resulting in considerable increases in the manufacturing cost and power consumption.

Third, since the conventional coffee roaster is configured such that the temperature sensor 50 is installed to measure only the internal temperature of the drum chamber 30 and the inside of the drum chamber 30 is heated while turning on/off the heating means 40 irrespective of the coffee bean temperature. Therefore, since the coffee beans are not normally roasted, the taste and flavor of coffee may considerably degrade with changes in the temperature and heating time.

In particular, with the temperature sensing structure, it is quite difficult to obtain uniform roasting results, that is, it is difficult to reproduce coffee having the consistent taste and flavor. Therefore, the conventional coffee roaster is difficult to be commercialized to be well-suited for home use or small-scale roasting.

SUMMARY

To solve the aforementioned problems, the present invention provides a coffee roaster, which can easily control the temperature and can perform an accurate roasting operation.

The above and other objects of the present invention will be described in or be apparent from the following description of the preferred embodiments.

According to an aspect of the present invention, there is provided a coffee roaster including a housing, a supporting plate located within the housing including a heating means in a predetermined region, a drum chamber located at one side of the supporting plate within the housing, a first supporting unit for supporting the drum chamber, the first supporting unit being installed to be adjacent to the outer circumferential surface of the drum chamber, and a second supporting unit for supporting the drum chamber, the second supporting unit being installed to be adjacent to the outer circumferential surface of the drum chamber and being spaced apart from the first supporting unit by a predetermined distance.

The heating means may be located within the drum chamber.

The first supporting unit may be connected to a driving motor and may be rotated as the driving motor is rotated.

The supporting plate may be disposed to be perpendicular to the ground and the heating means may be disposed to be perpendicular to a plane of the supporting plate.

The heating means may be shaped of a flat panel and the flat-panel shaped heating means may be disposed to be tilted at an angle ranging from 5 degrees to 45 degrees from the ground.

The coffee roaster may further include an opening positioned in front of the housing.

The drum chamber may have a smaller diameter than the opening.

The coffee roaster may further include a door unit for opening or closing the opening, wherein the door unit includes a supporting frame and a window unit coupled to the supporting frame.

The supporting plate may further include an inlet unit for inducing coffee beans into the drum chamber and an outlet unit for discharging roasted coffee beans.

The supporting plate may further include a discharge hole for discharging exhausted gas or smoke generated during roasting of the coffee beans to the outside and a temperature sensor for sensing the internal temperature of the drum chamber.

The coffee roaster may further include a condensing unit provided within the housing, wherein the condensing unit cools and condenses the exhausted gas or smoke discharged from the discharge hole.

As described above, according to the present invention, since a driving force for rotating the drum chamber is transferred from a first supporting unit, the drum chamber can be rotated without being obstructed by the heating means.

In addition, according to the present invention, since the inside of the housing can be observed through the window unit even when the door unit closes the opening, and according to the user's necessity, the drum chamber can be extracted from the housing through the opening after the door unit is opened, the inside of the housing can be cleaned and the drum chamber can be easily cleaned.

Further, since the surface temperature of roasted coffee beans can be directly sensed, it is easy to control the temperature and an accurate roasting operation can be achieved.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Like numbers refer to like elements throughout. As used herein, the term "and/or" includes any and all combinations of one or more of the associated listed items.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises" and/or " comprising," when used in this specification, specify the presence of stated components, but do not preclude the presence or addition of one or more other components thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Hereinafter, exemplified embodiments of the present invention will be described with reference to the accompanying drawings.

Figure 2:
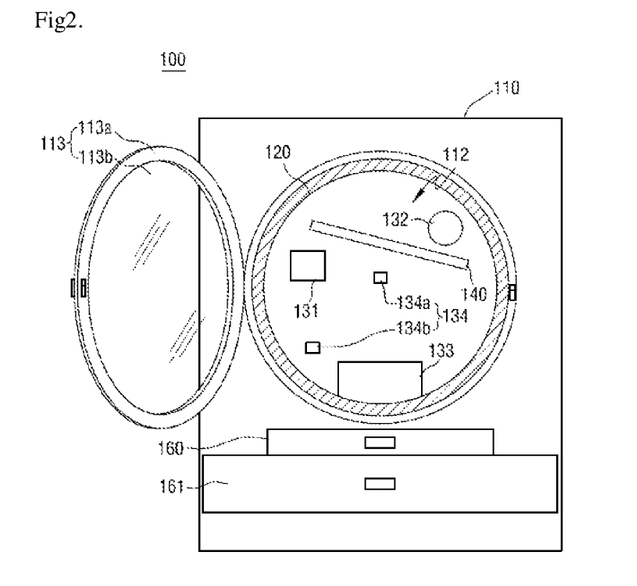
FIG. 2 is a front view of a coffee roaster according to an embodiment of the present invention.
Figure 3:
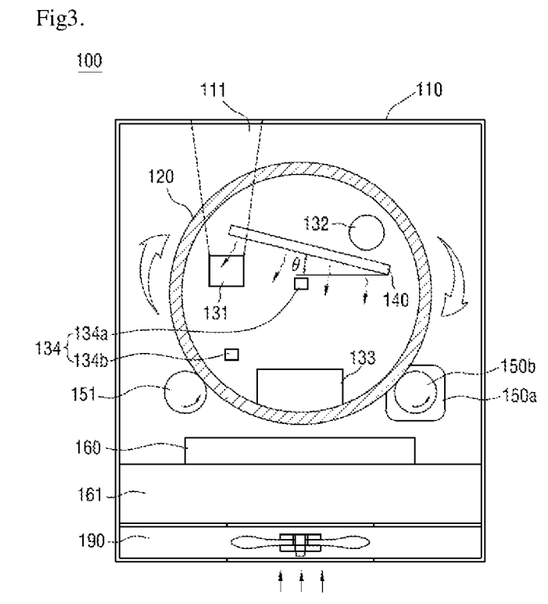
FIGS. 3 and 4 are a front view and a side view illustrating the inside of the coffee roaster shown in FIG. 2.
Figure 4:
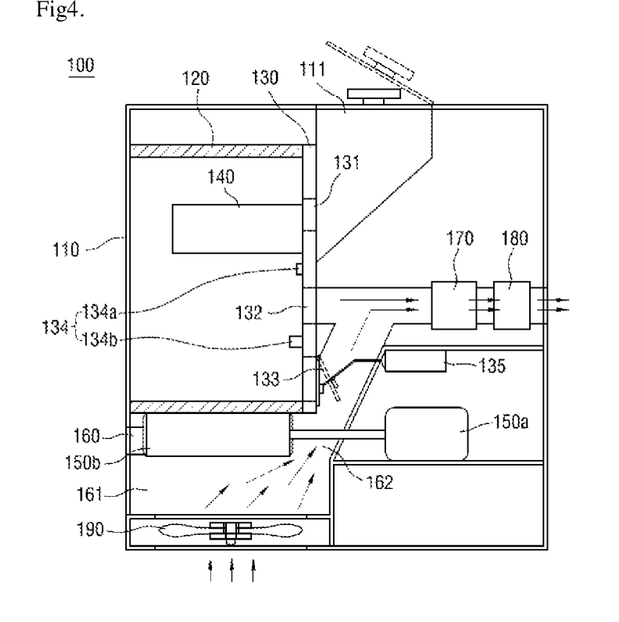

FIG. 2 is a front view of a coffee roaster according to an embodiment of the present invention, and FIGS. 3 and 4 are a front view and a side view illustrating the inside of the coffee roaster shown in FIG. 2.

First, referring to FIG. 2, the coffee roaster 100 according to the present invention includes a housing 110 and an opening 112 formed at one side of the housing 110, for example, in the front of the housing 110.

In addition, the coffee roaster 100 according to the present invention may include a door unit 113 positioned at one side of the housing 110 and opening or closing the opening 112. Here, the door unit 113 includes a supporting frame 113a and a window unit 113b coupled to the supporting frame 113a. Even when the door unit 113 closes the opening 112, the inside of the housing 110 can be observed through the window unit 113b.

Next, referring to FIGS. 2, 3 and 4, the coffee roaster 100 according to the present invention includes a supporting plate 130 located within the housing 110 and including a heating means 140 in a predetermined region.

Here, the supporting plate 130 may be disposed to be perpendicular to the ground and the heating means 140 may be disposed to be perpendicular to a plane of the supporting plate 130.

In the present invention, the heating means 140 is a preferably a flat-panel shaped heater for uniform heat transfer, specifically a flat-panel shaped ceramic heater.

In addition, in the present invention, the flat-panel shaped heating means 140 is preferably disposed to be tilted at an angle ranging from 5 degrees to 45 degrees from the ground.

As shown, in the present invention, a drum chamber to be described later is rotated in a predetermined direction, for example, in a counterclockwise direction. Due to the inertia derived from the clockwise rotation of the drum chamber, coffee beans are primarily positioned in the left bottom surface of FIG. 3 (151 of FIG. 3), rather than in the bottom surface of the drum chamber.

Therefore, in the present invention, the flat-panel shaped heating means may be disposed to be tilted at an angle ranging from 5 degrees to 45 degrees from the ground, thereby maximizing heat transfer efficiency of the heating means.

Meanwhile, the area and numbers of the heating means, that is, the ceramic heater 140, may be arbitrarily determined according to the size of the drum chamber 120.

In addition, the coffee roaster 100 according to the present invention includes a drum chamber 120 located within the housing 110 and roasting coffee beans.

Figure 5:
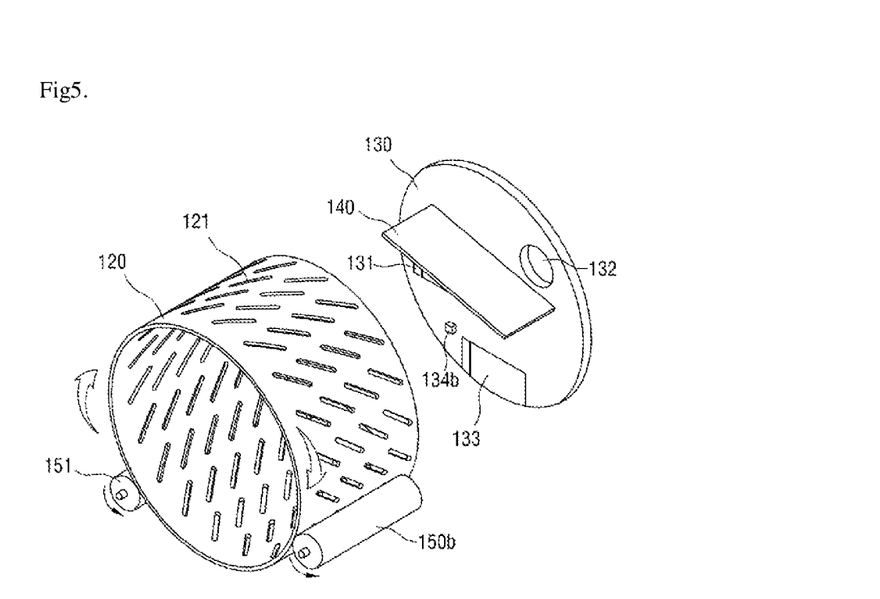
FIG. 5 is a view illustrating a drum chamber and a supporting plate of a coffee roaster according to the present invention.

Referring to FIG. 5, a drum chamber 120 having a cylindrical drum shape is disclosed in the illustrated embodiment, the shape of the drum chamber 120 is not limited to the cylindrical drum shape. Rather, the drum chamber 120 may also be formed in a polygonal shape, which is substantially similar to a cylindrical shape.

If the drum chamber 120 is formed in a polygonal shape, rather than in a cylindrical shape, a frictional force between the rotating drum chamber 120 and coffee beans during roasting. Therefore, coffee beans can be easily peeled off and roasted coffee beans can be uniformly agitated and rotated.

In addition, gaps 124 are provided at polygonal connection parts, thereby easily peeling off the hulls of roasted coffee beans and effectively discharging the hulls to a first receiving cartridge 160.

Figure 6:
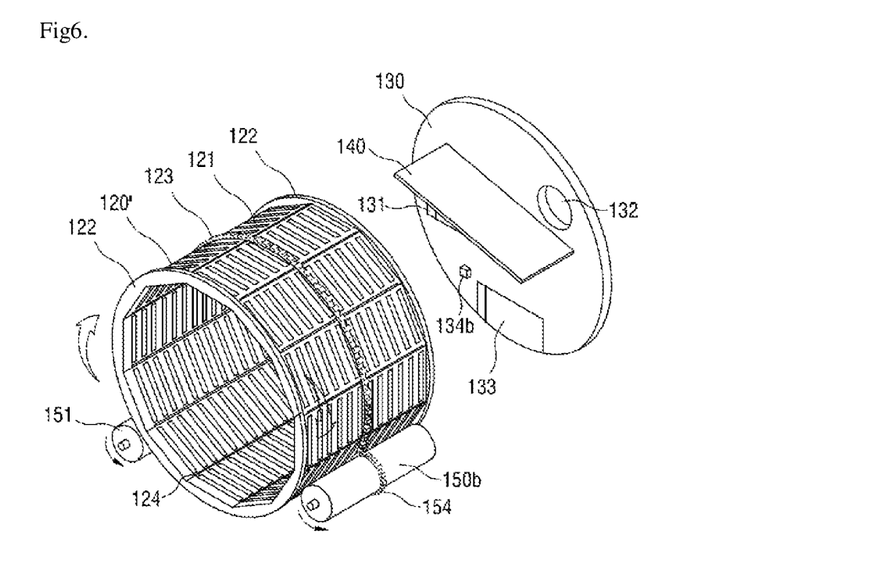
FIG. 6 is a view illustrating a drum chamber and a supporting plate of a coffee roaster according to still another embodiment of the present invention.

Referring to FIG. 6, according to still another embodiment of the present invention, a drum chamber 120' may be formed in a dodecagonal drum shape, and circular flange units 122 are formed at opposite ends of the drum chamber 120' to support a polygonal drum when the drum chamber 120' for roasting is rotated.

Next, the drum chamber 120 may be positioned at one side, for example, in the front, of a supporting plate, and coffee beans are induced into the drum chamber to be roasted.

That is to say, coffee beans are placed within the drum chamber 120 to then be roasted as the drum chamber 120 is rotated.

Here, the drum chamber 120 is preferably formed using a highly thermally conductive material, such as aluminum, copper, iron or stainless steel, and may be rotatably installed in front of the supporting plate 130.

In the present invention, a heating means 140 in a predetermined region of the supporting plate 130 is located within the drum chamber 120.

Therefore, in the present invention, it is important for the drum chamber 120 to be rotated without being obstructed by the heating means 140.

Referring to FIGS. 2, 3 and 4, the coffee roaster 100 according to the present invention includes a first supporting unit 150b installed to be adjacent to the outer circumferential surface of the drum chamber 120 and supporting the drum chamber 120, and a second supporting unit 151 spaced a predetermined distance apart from the first supporting unit 150b and supporting the drum chamber 120. Here, the second supporting unit 151 is also installed to be adjacent to the outer circumferential surface of the drum chamber 120.

Meanwhile, the first supporting unit 150b may be connected to a driving motor 150a, the first supporting unit 150b may be rotated as the driving motor 150a is rotated.

That is to say, the first supporting unit 150b may receive a rotational force of the driving motor 150a to then be rotated in a predetermined direction, and as the first supporting unit 150b is rotated, the drum chamber 120 may be rotated.

Here, as the drum chamber 120 is rotated, the second supporting unit 151 may support the drum chamber 120 while rotating in the same direction with a direction in which the first supporting unit 150b is rotated.

That is to say, as described above, in the present invention, it is important for the drum chamber 120 to be rotated without being obstructed by the heating means 140. To this end, since the drum chamber 120 is rotated by receiving a driving force for rotating the drum chamber 120 from the first supporting unit 150b, the drum chamber 120 can be rotated without being obstructed by the heating means 140.

Here, the second supporting unit 151 may support the drum chamber 120 while naturally rotating as the drum chamber 120 is rotated.

That is to say, in the coffee roaster 100 according to the present invention, the drum chamber 120 is rotated about the fixed supporting plate 130 provided with the heating means 140 without a separate rotary shaft.

A rotating force of the first supporting unit 150b installed to be adjacent to the outer circumferential surface of the drum chamber 120 is received and the drum chamber 120 is rotated due to friction between the first supporting unit 150b and the drum chamber 120.

In the conventional coffee roaster, since a heater is installed outside a drum, heat transfer efficiency may be lowered. In addition, since the heater is formed using a metal, it is difficult to evenly roast both skin (hull) and kernel of coffee bean. In order to reduce a roasting time, a heating temperature for roasting may be raised, which may, however, result in uneven roasting between the skins and the kernels of coffee beans, for example, scorching of the skins and incomplete roasting of the kernels.

In addition, even in a case of a large-scale coffee roaster including a heating means located within a chamber, since a rotation driving shaft is installed in a rotating drum chamber or a separate agitating device of coffee beans is required, the coffee roaster may occupy a large volume and may have an increased load of motor.

However, in the coffee roaster 100 according to the present invention, the drum chamber 120 is rotated by the frictional force derived from a rotational force of the first supporting unit 150b installed on the outer circumferential surface of the drum chamber 120. Therefore, the coffee roaster 100 according to the present invention does not require a separate rotating shaft or a separate power shaft, thereby securing a sufficiently large space for roasting coffee beans, thereby evenly roasting the coffee beans accommodated in the drum chamber 120 by automatically agitating the coffee beans according to rotation of the drum chamber 120. That is to say, in a state in which an excessive load is not applied, the drum chamber 120 for roasting coffee beans can be rotated just by a small amount of driving force, the capacity and size and power consumption of the first supporting unit 150b can be considerably reduced.

Therefore, the coffee roaster having a reduced size, low noises and small power consumption can be manufactured.

Figure 7:
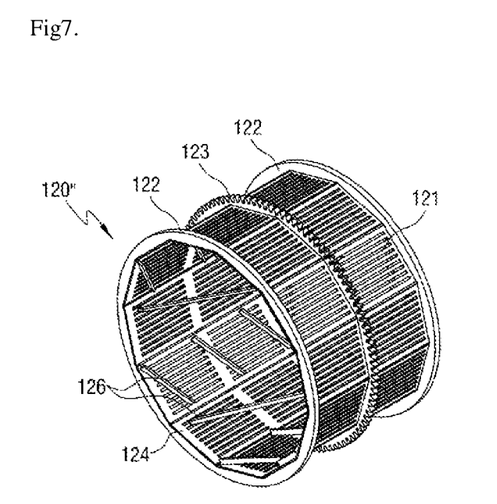
FIG. 7 is a view illustrating a drum chamber of a coffee roaster according to still another embodiment of the present invention.

Referring to FIG. 7, according to still another embodiment of the present invention, an impeller 126 having a variety of shapes may be provided within a drum chamber 120" to allow coffee beans to be evenly mixed during roasting and to be rapidly moved to an outlet unit 133 even after roasting.

Meanwhile, in the illustrated embodiment, the first supporting unit 150b is connected to the driving motor 150a and the second supporting unit 151 supports the drum chamber 120 without being connected to a separator driving motor. However, the second supporting unit 151 may also be connected to the driving motor 150a, and a driving force may be applied to the drum chamber 120.

Meanwhile, as described above, the drum chamber 120 is rotated by the frictional force between the first supporting unit 150b and the second supporting unit 151 adjacent to the outer circumferential surface of the drum chamber 120. When the drum chamber 120 is rotated just by the frictional force of the outer circumferential surface, the outer circumferential surface of the drum chamber 120 and the outer circumferential surface of the first supporting unit 150b and the second supporting unit 151 may wear. In this case, the drum chamber 120 may be spaced apart from the first supporting unit 150b and the rotational force may be not properly applied to the drum chamber 120 and may not be engaged with the first supporting unit 150b, resulting in lost motion.

Figure 8:
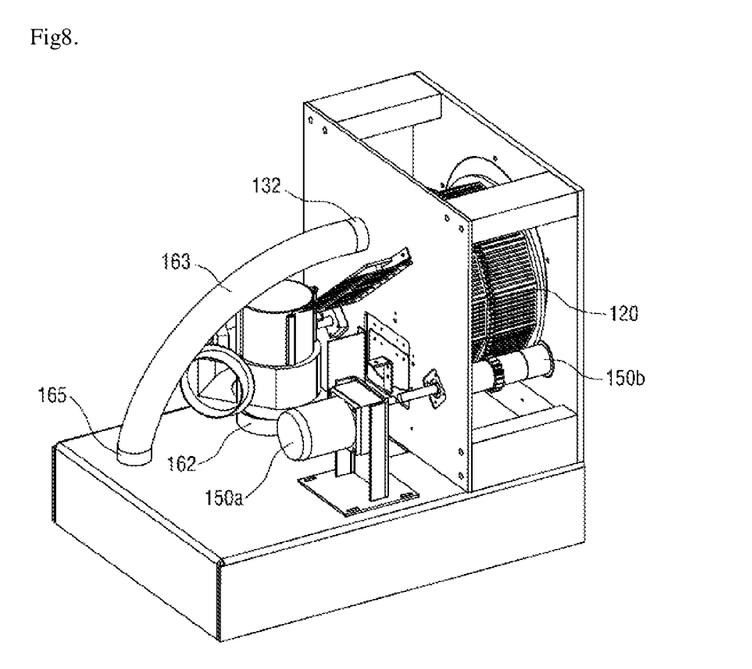
FIGS. 8 and 9 are views partially illustrating an exhausted gas inducing process of a coffee roaster according to still another embodiment of the present invention.

Therefore, in order to facilitate rotation of the drum chamber 120, a gear unit 123 is formed on the outer circumferential surface of the drum chamber 120 and a gear unit 154 is formed on the outer circumferential surface of the first supporting unit 150b adjacent to the outer circumferential surface of the drum chamber 120, so that the gear units 123 and 154 are engaged with each other during rotation (see FIGS. 6 and 8).

Accordingly, the first supporting unit 150b may receive power from a driving motor to then transfer the rotational force to the drum chamber 120 in an accurate speed ratio. In addition, the first supporting unit 150b may have an extended durability.

Next, referring to FIG. 2, as described above, the coffee roaster 100 according to the present invention includes the housing 110 and the opening 112 formed at one side of the housing 110, for example, in the front of the housing 110. In addition, the coffee roaster 100 includes the door unit 113 positioned at one side of the housing 110 and opening or closing the opening 112.

In the present invention, a diameter of the drum chamber 120 is smaller than that of the opening 112.

As described above, in the present invention, since the inside of the housing 110 can be observed through the window unit even when the door unit 113 closes the opening 112. In addition, after a predetermined roasting operation is completed, according to the user's necessity of, for example, cleaning the drum chamber 120 or the inside of the housing 110, the drum chamber 120 can be extracted from the housing 110 through the opening 112 after the door unit 113 is opened, the drum chamber 120 can be easily cleaned or the inside of the housing 110 can be cleaned.

In the present invention, the drum chamber 120 is configured to be supported by the first supporting unit 150b and the second supporting unit 151 and to be rotated by rotation of the first supporting unit 150b. That is to say, since the drum chamber is not fixed, it can be easily extracted from the housing 110.

As described above, since a rotating shaft of the first supporting unit 150b and a rotating shaft of the second supporting unit 151, which are associated with the rotation of the drum chamber 150 are installed outside the drum chamber 150, the drum chamber 120 can be separated, regardless of the state of the motor, which is advantageous in view of maintenance.

Next, referring to FIGS. 2, 3 and 4, the coffee roaster 100 according to the present invention includes a hopper 111 positioned in a predetermined region of the housing 110, for example, in a top portion of the housing 110, and coffee beans may be put into the housing 110 through the hopper 111.

In addition, the coffee roaster 100 according to the present invention may include a blower 170 installed on a predetermined region in the housing 110, for example, on the rear surface of the supporting plate 130, and blowing in exhausted gases and smoke, which will later be described, and a smoke eliminator 180 for eliminating the exhausted gases and smoke blown in from the blower 170.

Meanwhile, in the illustrated embodiment, the blower 170 and the smoke eliminator 180 are positioned within the housing 110. Alternatively, the blower 170 and the smoke eliminator 180 may be separately positioned outside the housing 110.

In addition, the coffee roaster 100 according to the present invention may include a first receiving cartridge 160 located below the drum chamber 120 and storing coffee bean hulls generated after roasting and a second receiving cartridge 161 storing roasted coffee beans. In addition, the coffee roaster 100 according to the present invention may further include a cooling fan 190 located below the second receiving cartridge 161 and cooling roasted coffee beans, and a control unit controlling a roasting process of coffee beans.

Here, the first receiving cartridge 160 and the second receiving cartridge 161 may be configured as a drawer detachably installed in the coffee roaster, but the present invention does not limit the configuration of the receiving cartridge to that disclosed herein.

Hereinafter, a supporting plate of the coffee roaster according to the present invention will be described in detail.

As described above, the coffee roaster 100 according to the present invention includes a supporting plate 130 having a heating means 140 installed in a predetermined region.

Here, the supporting plate 130 may be disposed to be perpendicular to the ground and the heating means 140 may be disposed to be perpendicular to a plane of the supporting plate 130.

In addition, the supporting plate 130 includes an inlet unit 131 for inducing coffee beans into the drum chamber 120 and an outlet unit 133 for discharging roasted coffee beans.

That is to say, the coffee beans supplied from the hopper 111 may be induced into the drum chamber 120 through the inlet unit 131, and the roasted coffee beans may be exhausted through the outlet unit 133 with rotation of the drum chamber 120 and may then be stored in the second receiving cartridge 161 located below the first receiving cartridge 160.

Here, an automatic exhausting means 135 having a wire or a rectangular plate attached thereto is provided in the rear surface of the outlet unit 133. In the present embodiment, the automatic exhausting means 135 may be operated by a solenoid.

That is to say, the automatic exhausting means 135 including the solenoid is configured to selectively open or close the outlet unit 133 by driving the control unit, and the solenoid is connected to a top portion of the outlet unit 133, so that the outlet unit 133 may be opened or closed while an operation bar moves back and forth according to the operation of the solenoid.

Therefore, the outlet unit 133 is in a closed state during roasting, and after the roasting is completed, the automatic exhausting means 135 of the supporting plate 130 is operated by the control unit to open the outlet unit 133. The coffee beans are dropped from the outlet unit 133 through an exhaust hole 162 formed above the second receiving cartridge 161 to then be automatically stored.

Meanwhile, the coffee bean hulls generated by roasting coffee beans during rotation of the drum chamber 120 may be stored in the first receiving cartridge 160 located below under the drum chamber 120.

In addition, the supporting plate 130 may include a discharge hole 132 for discharging exhausted gas or smoke generated during roasting of the coffee beans to the outside.

That is to say, when coffee beans are roasted, certain exhausted gas or smoke from the coffee beans may be generated in the drum chamber 120. The exhausted gas or smoke may be discharged to the outside of the drum chamber 120 through the discharge hole 132 of the supporting plate 130.

In addition, as described above, the blower 170 for blowing in the exhausted gases and smoke to be described later may be installed on a predetermined region in the housing 110, for example, on the rear surface of the supporting plate 130. The blower 170 blows in the exhausted gases and smoke discharged from the discharge hole 132, and the blown-in exhausted gas or smoke may be eliminated by the smoke eliminator 180.

Meanwhile, the roasted coffee beans may be exhausted through the outlet unit 133 to then be stored in the second receiving cartridge 161 located below the first receiving cartridge 160.

While the roasted coffee beans stored in the second receiving cartridge 161 are cooled, the exhausted gases and smoke may be generated, and the generated exhausted gases and smoke may also be blown in through the blower 170 and may be eliminated through the smoke eliminator 180.

In addition, as described above, in the embodiment of the present invention, the cooling fan 190 may be provided below the second receiving cartridge 161 and may cool the roasted coffee beans, and a control unit controlling a roasting process of coffee beans.

That is to say, after roasting, the roasted coffee beans dropped to the second receiving cartridge 161 may be immediately cooled by the cooling fan 190. The air resulting from the cooling may be induced to the blower 170 through the exhaust hole 162 provided above the second receiving cartridge 161 and may be emitted to the outside.

For example, at the same time when the cooling fan 190 blows cooled air from the second receiving cartridge 161 to the exhaust hole 162, the coffee beans are cooled and the blower 170 is driven above the exhaust hole 162. Thus, the cooled air used in cooling the coffee beans is induced to the blower 170 through the exhaust hole 162 and is finally emitted to the outside through the smoke eliminator 180, thereby effectively cooling the roasted coffee beans.

As described above, in an embodiment of the present invention, referring to FIG. 4, the exhausted gases and smoke generated from the drum chamber 120 during roasting are discharged through the discharge hole 132 formed in the supporting plate 130 of the drum chamber 120 and are induced directly to the blower 170.

In addition, after the roasting is completed, the exhausted gases and smoke generated in the course of cooling the coffee beans stored in the second receiving cartridge 161 are also induced to the blower 170 through the exhaust hole 162. That is to say, the discharge hole 132 of the supporting plate 130 and the exhaust hole 162 of the second receiving cartridge 161 are connected through pipes to be induced to the blower 170.

As described above, both of the gas generated during roasting and the heated air generated after roasting may be induced by the blower 170 to pass the smoke eliminator 180 and may be effectively emitted to the outside of the coffee roaster.

Meanwhile, as described above, in an embodiment of the present invention, the gases and smoke generated during roasting or after roasting are connected through pipes to be induced by the blower 170 and pass the smoke eliminator 180 to then be exhausted to the outside of the coffee roaster. However, since the gases and smoke generated during roasting contain moisture, the life of the blower 170 may be shortened by the heated air and moisture when the generated gases and smoke are induced directly to the blower 170.

Therefore, after the moisture contained in the gases and smoke generated during roasting is removed, the gases and smoke generated during roasting may be induced to the blower 170.

BEST MODE FOR CARRYING OUT THE INVENTION

Figure 9:
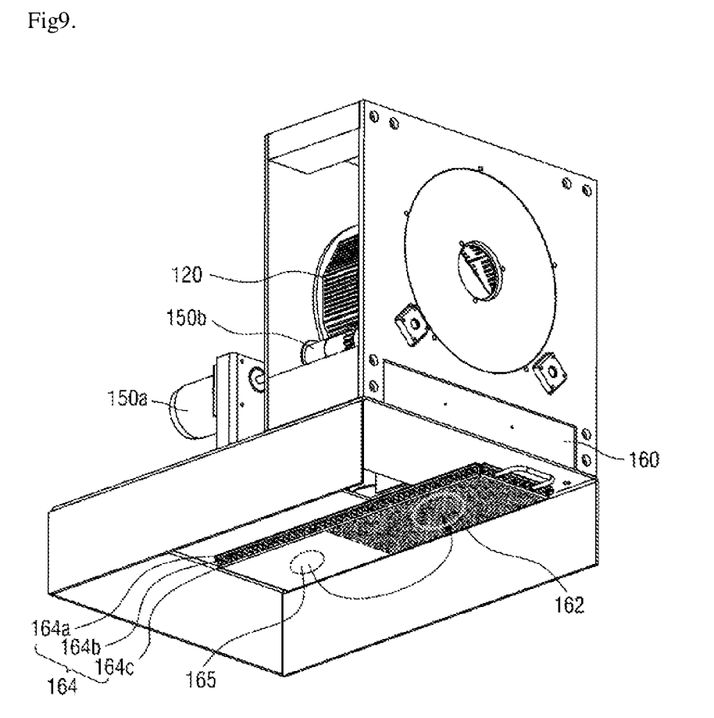

FIGS. 8 and 9 are views partially illustrating an exhausted gas inducing process of a coffee roaster according to still another embodiment of the present invention.

According to still another embodiment of the present invention, the gas containing the moisture and heated air generated from the drum chamber 120 during roasting of coffee beans is not induced directly to the blower 170 through the discharge hole 132 but is induced to the blower 170 after being subjected to a condensation process.

In more detail, the gas containing the moisture and heated air generated from the drum chamber 120 during roasting is discharged through the discharge hole 132 to then be exhausted to a hole 165 provided in the second receiving cartridge 161 through an exhaust pipe 163.

Next, the gas containing the moisture and heated air, introduced into the second receiving cartridge 161 through the hole 165, encounters the cooled air in the second receiving cartridge 161 to then undergo the condensation process in the condensing unit 164 provided above the second receiving cartridge 161.

Here, the condensing unit 164 includes an upper plate 164a, a condensed water storage unit 164b and a lower plate 164c, and some portions of the upper plate 164a and the lower plate 164c are preferably formed using a mesh net. The mesh net may prevent coffee bean hulls that may be secondarily generated from the coffee beans stored in the second receiving cartridge 161 after roasting from being discharged to the outside through the cooling fan 190.

In addition, the condensing unit 164 may be spaced a predetermined distance apart from a top surface of the second receiving cartridge 161 to allow the gas to be induced to the second receiving cartridge 161 or to allow the gas having undergone the condensation process to be smoothly exhausted.

In addition, in order to prevent the condensed water resulting from the condensation process in the condensing unit 164 from being dropped to the coffee beans stored in the second receiving cartridge 161, a portion of the lower plate 164c adjacent to the hole 165 may not include a mesh net. However, in order to allow the exhausted gas from which moisture is removed through the condensation process to be easily exhausted through the exhaust hole 162, another portion of the lower plate 164c adjacent to the exhaust hole 162 may include a mesh net.

Next, the exhausted gas from which moisture is removed through the condensation process is induced to the blower 170 via the condensing unit 164 and the exhaust hole 162.

Therefore, the exhausted gas generated from the drum chamber 120 during roasting is subjected to removal of heated air and moisture by the exhaust pipe 163 and the condensing unit 164 to then be induced to the blower 170, thereby increasing the life of the blower 170.

Meanwhile, the cooling fan 190 may be operated even during roasting. That is to say, the heated air generated in the course of roasting coffee beans goes through the discharge hole 132 of the supporting plate 130 to then be induced to the second receiving cartridge 161 through the exhaust pipe 163, and encounters the cooled air induced into the second receiving cartridge 161 through the cooling fan 190 to remove the heated air and moisture in the condensing unit 164 to then be induced to the blower 170. Accordingly, the temperature of the finally exhausted air can be lowered.

Referring to FIGS. 8 and 9, according to still another embodiment of the present invention, since the blower 170 is connected through the exhaust hole 162 provided above the second receiving cartridge 161, the effect of cooling the roasted coffee beans stored in the second receiving cartridge 161 may also be exerted using the blower 170. Therefore, effective cooling can be achieved even without a separate cooling fan.

Next, the supporting plate 130 may include a temperature sensor 134 for sensing the internal temperature of the drum chamber 120.

A temperature sensor 134 is provided to be exposed on a front surface of the supporting plate 130 and may directly measure the surface temperature of coffee beans agitated in the rotating drum chamber 120.

In a case of the temperature sensor provided in the conventional coffee roaster, the surface temperature of a drum, rather than the surface temperature of coffee beans, is measured to control the heater, which may result in a severe variation in the measured temperature according to the state of coffee beans and ambient temperature, thereby lowering reproducibility. Another problem with the conventional coffee roaster is in that it is not so easy for an inexperienced person to use the coffee roaster.

In contrast, the temperature sensor 134 of the coffee roaster according to the present invention is configured to continuously measure the internal temperature of coffee beans accommodated in the drum chamber 120, thereby more accurately sensing the temperature and more elaborately controlling the roasting. Accordingly, even a beginner is able to easily perform optimum coffee roasting in consideration of the taste, flavor and beneficial nutrients, regardless of the external circumstances and temperatures.

In particular, the temperature sensor 134 may include an ambient temperature sensor 134a installed inside the drum chamber 120 and a surface temperature sensor 134b being in contact with coffee beans to be roasted. Therefore, the temperature sensor can more accurately control the roasting while sensing the ambient temperature of the drum chamber 120 and the surface temperatures of the coffee beans to be actually roasted.

Preferably, the ambient temperature sensor 134a is located so as not to make direct contact with roasted coffee beans, while the surface temperature sensor 134b is necessarily located to make direct contact with roasted coffee beans.

Accordingly, if an input amount of coffee beans exceeds an appropriate level, the ambient temperature sensor 134a making contact with coffee beans may warn of an excessive input of coffee beans to perform automatic exhaustion of the excessively input coffee beans.

Meanwhile, operations of the temperature sensor 134, the ceramic heater 140, the solenoid, etc. may be controlled by the control unit.

The control unit may be constructed by a microprocessor computer, to be briefly referred to as a "micom" hereinafter, the micom having an built-in program for controlling various internal devices, including an input unit for receiving various types of data, an output unit for displaying a current state, the input and output units, the temperature sensor, the first supporting unit 150, the ceramic heater 140, the solenoid, etc.

The input and output units are configured such that a user can easily enter data through a menu window provided in the housing 110, and the program built in the micom may include various input data regarding roasting conditions based on coffee beans depending on the kind of coffee.

Therefore, if the user has only to select a desired type of coffee through the menu window, coffee beans are automatically roasted at an appropriate temperature for an appropriate time according to the preprogrammed roasting conditions and then stored in the second receiving cartridge 161. The user can grasp the situation of roasting in progress through the menu window provided in the housing 110.

FIG. 5 is a view illustrating a drum chamber and a supporting plate of a coffee roaster according to the present invention, and FIG. 6 is a view illustrating a drum chamber and a supporting plate of a coffee roaster according to still another embodiment of the present invention.

Referring to FIGS. 5 and 6, in the coffee roaster according to the present invention, each of drum chambers 120 and 120' may include a plurality of slit-shaped hull exhaust holes 121 passing through inner and outer circumferential surfaces of the drum chambers 120 and 120'.

The coffee beans accommodated in the drum chamber 120, 120' may chafe against the slit-shaped hull exhaust holes 121 according to rotation of the drum chamber 120, 120' to produce hulls peeled off from the coffee beans, which are to be naturally dropped by gravity to the first receiving cartridge 160 located below the drum chamber 120. Here, the shapes of the hull exhaust holes 121 are not limited to the slit shape disclosed in the present invention.

Meanwhile, as described above, during roasting, gases and smoke may be generated by volatilization of oil components derived from raw coffee beans exposed to heat for roasting. The generated gases and smoke are constantly discharged through the discharge hole 132 formed in the supporting plate 130.

The gases and smoke discharged through the discharge hole 132 goes through the smoke eliminator 180 via the blower 170 to then be emitted to the outside. The smoke eliminator 180 may include a filter for eliminating the smoke contained in the exhausted gases or a heater for instantaneously performing full combustion on the exhausted gases at high temperatures to then eliminate the smoke. Finally, the smoke is discharged to the outside of the coffee roaster only in too a negligible level to be visually identified.

Therefore, since the smoke generated during roasting can be effectively eliminated by the smoke eliminator 180, the coffee roaster according to the present invention can be used in a narrow indoor space or home in a safe, agreeable manner The aforementioned coffee roaster according to the present invention operates in the following manner First, if coffee beans to be roasted are input to the hopper 111, the coffee beans having gone through a passageway connected to the hopper 111 are dropped into the drum chamber 120 located below the hopper 111 through the inlet unit 131 formed in the supporting plate 130.

Next, if the user selects his/her favorable kind of coffee through the menu window, the control unit controls the operations of the temperature sensor 134, the driving motor 150a, the heating means 140 (e.g., ceramic heater) and 140, the solenoid, etc. according to the pre-programmed roasting conditions suitably input to conform to the user's selected kind of coffee.

The first supporting unit 150b is first operated to rotate the drum chamber 120 in one direction. At the same time, the heating means 140 generates heat until the temperature of coffee beans reaches a predetermined level. The temperature of coffee beans is monitored in real time by the temperature sensor 134 installed in the supporting plate 130, and once the average temperature sensed by the temperature sensor 134 reaches the predetermined level, the control unit may control the heating means 140 to stop operating. Therefore, unlike in the conventional coffee roaster in which the surface temperature of the drum chamber 120 is sensed, in the coffee roaster according to the present invention, the temperature of coffee beans being roasted is accurately measured, thereby enabling a more accurate roasting process operation.

In addition, since the drum chamber 120 rotates but the heating means 140 is fixedly installed in the supporting plate 130 so as not to rotate, the internal temperature of the drum chamber 120 is evenly raised, thereby evenly roasting the coffee beans.

Therefore, the coffee roaster 100 according to the present invention can prevent the surface temperature of the drum chamber 120 from being unevenly raised due to rotation of the heating means together with the drum chamber 120 and can prevent only coffee bean skins (hulls) from being scorched due to uneven roasting between the skins and the kernels of coffee beans, unlike the conventional coffee roaster.

Meanwhile, the exhausted gases and smoke generated during roasting are induced to the blower 170 and then discharged through the discharge hole 132 formed in the supporting plate 130. The exhausted gases and smoke discharged through the discharge hole 132 go through the smoke eliminator 180 and the relatively clean, purged air is finally emitted to the outside of the coffee roaster.

Next, the coffee beans roasted in the drum chamber 120 chafe against the slit-shaped hull exhaust holes 121 passing through the inner and outer circumferential surfaces of the rotating drum chamber 120 to produce hulls peeled off from the coffee beans and then dropped to the first receiving cartridge 160 located below the drum chamber 120.

If the temperature of roasted coffee beans reaches a target temperature level, the temperature sensor 134 senses the reaching of the target temperature level and the control unit controls the ceramic heater 140 to stop operating while controlling the solenoid of the automatic exhausting means 135 to operate, thereby opening the exhaust hole 162. Consequently, the roasted coffee beans are dropped to the second receiving cartridge 161 to then be stored therein.

Next, the roasted coffee beans are immediately cooled by the wind from the cooling fan 190 located below the second receiving cartridge 161, and the cooled air is induced to the blower 170 through the exhaust hole 162 located above the second receiving cartridge 161 to then be emitted to the outside via the smoke eliminator 180.

Meanwhile, since the discharge hole 132 of the supporting plate 130 and the exhaust hole 162 of the second receiving cartridge 161 are connected through pipes to then be connected to the blower 170, the heated air generated during roasting goes through the discharge hole 132 of the supporting plate 130 and then encounters the cooled air emitted from the exhaust hole 162 through the cooling fan 190 in the pipes. The heated air and the cooled air are intermixed to be induced to the blower 170 to be lowered in temperature and then emitted to the outside via the smoke eliminator 180, thereby lowering the finally emitted air and ultimately improving the durability of the coffee roaster against the high temperature for roasting.

INDUSTRIAL APPLICABILITY

In the coffee roaster according to the present invention, since a driving force for rotating the drum chamber 120 is transferred from the first supporting unit 150b, the drum chamber 120 can be rotated without being obstructed by the heating means 140.

In addition, according to the present invention, since the inside of the housing 110 can be observed through the window unit even when the door unit 113 closes the opening 112, and according to the user's necessity, the drum chamber 120 can be extracted from the housing 110 through the opening 112 after the door unit 113 is opened, the inside of the housing 110 can be cleaned and the drum chamber 120 can be easily cleaned.

Further, since the surface temperature of roasted coffee beans can be directly sensed, it is easy to control the temperature and an accurate roasting operation can be achieved.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A coffee roaster comprising:
    a housing;
    a supporting plate located within the housing and including a heating means in a predetermined region;
    a drum chamber located at one side of the supporting plate within the housing, wherein the drum chamber rotates about an axis of rotation that extends in a front-to-back direction of the drum chamber,
        wherein the heating means has a shape of a flat panel that extends in the front-to-back direction and a side-to-side direction of the drum chamber, wherein the side-to-side direction is perpendicular to the front-to-back direction,
        wherein the heating means is located within the drum chamber and is disposed such that the flat panel is tilted at an angle ranging from 5 degrees to 45 degrees relative to the ground, wherein the flat panel is tilted at the angle such that one side in the side-to-side direction is higher than the other side;
    a first supporting unit for supporting the drum chamber,
        wherein the first supporting unit is adjacent to an outer circumferential surface of the drum chamber,
        wherein the first supporting unit is connected to a driving motor and is configured to rotate as the driving motor rotates,
        wherein the drum chamber is configured to rotate due to the rotation of the first supporting unit,
        wherein the drum chamber includes a first gear unit disposed on the outer circumferential surface of the drum chamber and a second gear unit disposed on an outer circumferential surface of the first supporting unit, wherein the first and second gear units are configured to rotate by being engaged with each other; and
    a second supporting unit for supporting the drum chamber, wherein the second supporting unit is adjacent the outer circumferential surface of the drum chamber and is spaced apart from the first supporting unit by a predetermined distance.

2. The coffee roaster of claim 1, wherein the first supporting unit is connected to a driving motor and is rotated as the driving motor is rotated.

3. The coffee roaster of claim 1, wherein the supporting plate is disposed to be perpendicular to the ground and the heating means is disposed to be perpendicular to a plane of the supporting plate.

4. The coffee roaster of claim 1, wherein the heating means is disposed such that the flat panel is not tilted at an angle in the front-to-back direction relative to the ground.

5. The coffee roaster of claim 1, further comprising an opening positioned in front of the housing.

6. The coffee roaster of claim 5, wherein the drum chamber has a smaller diameter than the opening.

7. The coffee roaster of claim 5, further comprising a door unit for opening or closing the opening, wherein the door unit includes a supporting frame and a window unit coupled to the supporting frame.

8. The coffee roaster of claim 1, wherein the supporting plate further comprises an inlet unit for inducing coffee beans into the drum chamber and an outlet unit for discharging roasted coffee beans.

9. The coffee roaster of claim 1, wherein the supporting plate further comprises a discharge hole for discharging exhausted gas or smoke generated during roasting of the coffee beans to the outside and a temperature sensor for sensing the internal temperature of the drum chamber.

10. The coffee roaster of claim 9, further comprising a condensing unit provided within the housing, wherein the condensing unit cools and condenses the exhausted gas or smoke discharged from the discharge hole.

11. The coffee roaster of claim 1, further comprising:
    an ambient temperature sensor for sensing an ambient temperature of the drum chamber.

12. The coffee roaster of claim 11, further comprising:
    a surface temperature sensor for sensing a surface temperature of the coffee beans.

13. The coffee roaster of claim 12, further comprising:
    a controller to control the heating means based on the surface temperature of the coffee beans and the ambient temperature of the drum chamber.

14. A coffee roaster comprising:
    a housing;
    a supporting plate located within the housing and including a heater in a predetermined region;
    a drum chamber located at one side of the supporting plate within the housing, wherein the drum chamber rotates about an axis of rotation that extends in a front-to-back direction of the drum chamber,
        wherein the heater has a shape of a flat panel that extends in the front-to-back direction and a side-to-side direction of the drum chamber, wherein the side-to-side direction is perpendicular to the front-to-back direction,
        wherein the heater is located within the drum chamber and is disposed such that the flat panel is tilted at an angle ranging from 5 degrees to 45 degrees relative to the ground, wherein the flat panel is tilted at the angle such that one side in the side-to-side direction is higher than the other side;
    a first rotating circular support to support the drum chamber, wherein the first rotating circular support is adjacent to the outer circumferential surface of the drum chamber,
        wherein the first rotating circular support is connected to a driving motor and is configured to rotate as the driving motor rotates,
        wherein the drum chamber is configured to rotate due to the rotation of the first rotating circular support,
        wherein the drum chamber includes a first gear disposed on the outer circumferential surface of the drum chamber and a second gear disposed on the outer circumferential surface of the first rotating circular support, wherein the first and second gear are configured to rotate by engaging with each other; and
    a second rotating circular support to support the drum chamber, wherein the second rotating circular support is adjacent the outer circumferential surface of the drum chamber and is spaced apart from the first rotating circular support by a predetermined distance.

15. The coffee roaster of claim 14, further comprising:
a driving motor, wherein the first rotating circular support is connected to the driving motor and is configured to rotate as the driving motor rotates.

16. The coffee roaster of claim 14, wherein the heater is disposed such that the flat panel is not tilted at an angle in the front-to-back direction relative to the ground.

17. The coffee roaster of claim 14, further comprising:
an opening positioned in front of the housing, wherein the drum chamber has a smaller diameter than the opening; and
a condenser provided within the housing, wherein the condenser cools and condenses the exhausted gas or smoke discharged from the discharge hole.

18. The coffee roaster of claim 1, further comprising:
an ambient temperature sensor for sensing an ambient temperature of the drum chamber;
a surface temperature sensor for sensing a surface temperature of the coffee beans; and
a controller to control the heating means based on the surface temperature of the coffee beans and the ambient temperature of the drum chamber.

19. The coffee roaster of claim 1,
wherein the drum chamber has a first end in the front-to-back direction and a second end, opposite the first end, in the front-to-back direction,
wherein the first gear unit is disposed on the outer circumferential surface of the drum chamber between the first end and the second end.

20. The coffee roaster of claim 14,
wherein the drum chamber has a first end in the front-to-back direction and a second end, opposite the first end, in the front-to-back direction,
wherein the first gear unit is disposed on the outer circumferential surface of the drum chamber approximately half way between the first end and the second end.

* * * * *